US007122994B2

(12) United States Patent
Anghel et al.

(10) Patent No.: US 7,122,994 B2
(45) Date of Patent: Oct. 17, 2006

(54) CONTROL APPARATUS FOR A STARTER/GENERATOR SYSTEM

(75) Inventors: Cristian E. Anghel, Mississauga (CA); Edwin Yue, Markham (CA)

(73) Assignee: Honeywell International Inc., Morris Township, NJ (US)

(*) Notice: Subject to any disclaimer, the term of this patent is extended or adjusted under 35 U.S.C. 154(b) by 61 days.

(21) Appl. No.: 10/649,548

(22) Filed: Aug. 27, 2003

(65) Prior Publication Data

US 2005/0046398 A1 Mar. 3, 2005

(51) Int. Cl.
*H02P 9/10* (2006.01)
*H02P 9/14* (2006.01)

(52) U.S. Cl. ........................... 322/60; 322/10; 322/23; 363/54

(58) Field of Classification Search ................. 322/10, 322/23, 60; 363/54
See application file for complete search history.

(56) References Cited

U.S. PATENT DOCUMENTS 3,774,092 A * 11/1973 Messervey et al. ........... 318/99
4,039,909 A * 8/1977 Baker ......................... 318/732
4,494,372 A * 1/1985 Cronin ........................ 60/785
4,841,216 A 6/1989 Okada et al. ................. 322/10
4,862,009 A * 8/1989 King .......................... 290/22
4,937,508 A * 6/1990 Rozman ..................... 318/254
4,939,441 A 7/1990 Dhyanchand ............... 318/718
4,982,123 A 1/1991 Raad ........................ 310/68 D
5,066,866 A * 11/1991 Hallidy ....................... 290/1 R
5,068,590 A * 11/1991 Glennon et al. .............. 322/10
5,097,195 A 3/1992 Raad et al. ................... 322/10
5,189,375 A * 2/1993 Tuttle ......................... 324/537
5,325,043 A 6/1994 Parro .......................... 322/23
5,387,859 A 2/1995 Murugan et al. ............. 322/10
5,428,275 A 6/1995 Carr et al. .................. 318/146
5,488,286 A 1/1996 Rozman et al. ............... 322/10
5,493,201 A 2/1996 Baker .......................... 322/10
5,512,811 A * 4/1996 Latos et al. .................... 322/10
5,546,742 A * 8/1996 Shekhawat et al. ........... 60/788
5,581,168 A * 12/1996 Rozman et al. ............. 318/723
5,589,743 A * 12/1996 King .......................... 318/139
5,594,322 A * 1/1997 Rozman et al. ............... 322/10
5,715,151 A * 2/1998 Moriura ....................... 363/54
5,899,411 A 5/1999 Latos et al. ............... 244/53 A
5,903,116 A * 5/1999 Geis et al. .................. 318/140
5,930,134 A 7/1999 Glennon ..................... 363/127
6,943,531 B1 * 9/2005 Fukaya ........................ 322/10
6,989,655 B1 * 1/2006 Eguchi et al. ................ 322/23
6,998,726 B1 * 2/2006 Sarlioglu et al. ............. 290/31
7,009,365 B1 * 3/2006 Namuduri et al. ............ 322/23
7,045,986 B1 * 5/2006 Anghel et al. .............. 318/712

FOREIGN PATENT DOCUMENTS

WO WO 2004/038196 A 5/2004

* cited by examiner

*Primary Examiner*—Darren Schuberg
*Assistant Examiner*—Pedro J. Cuevas
(74) *Attorney, Agent, or Firm*—Birch, Stewart, Kolasch & Birch, LLP

(57) ABSTRACT

A control apparatus (202) for a starter/generator (110) of an aircraft electrical power system is provided. During a start mode of operation, AC power is provided by the control apparatus (202) to an exciter stator (114) of the starter/generator (110) which is combined with controlled AC power supplied by a start converter (106) to a main stator (116) of the starter/generator (110) to rotate and start an aircraft engine. Alternatively, during a generate mode of operation after engine start, the control apparatus (202) provides DC power to the starter/generator (110) to produce a regulated voltage output from the starter/generator (110).

19 Claims, 3 Drawing Sheets

CONTROL APPARATUS FOR A STARTER/GENERATOR SYSTEM

TECHNICAL FIELD

The present invention relates generally to electrical power systems. It particularly relates to a control apparatus to selectively provide AC and DC power for a brushless, synchronous starter/generator to start an engine and generate a regulated voltage during operation.

BACKGROUND OF THE INVENTION

As shown in FIG. 1, many prior art electrical power systems 100 use a brushless, synchronous electrical starter/generator 110 to generate AC power. Commonly, the starter/generator 110 includes a main generator, an exciter generator and a rectifier assembly 113 mounted on a rotor 112. The main generator includes a main stator 116 having a main stator coil (polyphase AC stator winding) and the DC main field winding 115. The exciter generator includes an exciter stator 114 including a DC winding 120 and the polyphase AC exciter armature winding 111. Rotor 112 includes a DC main field winding 115, polyphase AC exciter armature winding 111 and the rectifier assembly 113. For aircraft engine applications, the rotor 112 may be driven by an aircraft engine (not shown), after engine starting, to develop electrical power in the main stator coil 116. The electrical voltage output from main stator coil 116 is regulated at a point of regulation (POR) 108 for delivery to aircraft loads using an AC bus 118. In an exemplary embodiment, when DC excitation is supplied to DC winding 120, rotation of the generator shaft (not shown) by the aircraft engine causes the generation of a polyphase (as shown in FIG. 1) or single-phase voltage in the armature winding 111 that is rectified by the rectifier assembly 113 and coupled to the winding 115. This rectified voltage sets up a DC field in the main rotor field 115 which causes a rotating magnetic field in the main stator coil 116 that produces output power with regulated voltage at POR 108 (prior to the bus contact switch) for delivery to AC bus 118.

Additionally, the system 100 may use the starter/generator 110 as a motor to start the aircraft engine. An external power source (exciter power supply—EXPS) 104 is coupled to the generator 110 using the exciter stator 114. The coupled power from EXPS 104 induces AC power through transformer effect in the polyphase winding 111 or single-phase (not shown) of the rotor 112 because no relative motion between rotor and stator exists at zero speed. The AC power established in winding 111 may be rectified by rectifier assembly 113 to generate DC power in the main field winding 115. Additionally, a start converter 106 is used to supply controlled AC power to main stator coil 116 such that sufficient torque is produced by the starter/generator 110. This torque is produced by the interaction between the flux in the main rotor winding 115 and the current (flux) established in coil 116. The frequency of the controlled AC power is increased from 0 Hz (0 RPM) to a predetermined frequency corresponding to the angular speed of the for starter/generator 110 at the end of start. The phase of the current for the supplied AC power input is controlled to develop the desired torque for starter/generator 110. Advantageously, the current is approximately 90 degrees ahead of the flux established in winding 115 where this torque causes the generator shaft to rotate the aircraft engine, start it, and bring it to a predetermined (rated) speed.

Conventionally, after engine start using the exciter power supply 104 and start converter 106, control switches to a separate unit (generator control unit—GCU) 102 to supply DC power to the generator 110 and deliver regulated voltage to the AC bus 118 via the POR 108. Thus, two separate units 102, 104 must be utilized to provide control and input power, using a complex switching unit 103, for both starter and generation functionality for the electrical power system which leads to complex, costly, and heavy installation for the system in the aircraft.

Therefore, due to the disadvantages of current electrical power systems, there is a need to provide an aircraft electrical power system that supplies both starting and generating functionality using a single control/power unit which reduces the cost and weight of the system installation in the aircraft.

SUMMARY OF THE INVENTION

The system of the present invention overcomes the previously mentioned problems by providing a control apparatus for a starter/generator of an aircraft electrical power system. During a start mode of operation, AC power is provided by the control apparatus to an exciter stator of the starter/generator which is combined with controlled AC power supplied by a start converter to a main stator of the starter/generator to rotate and start an aircraft engine. Alternatively, during a generate mode of operation after engine start, the control apparatus provides DC power to the starter/generator to produce a regulated voltage output from the starter/generator.

DETAILED DESCRIPTION

Figure 1:
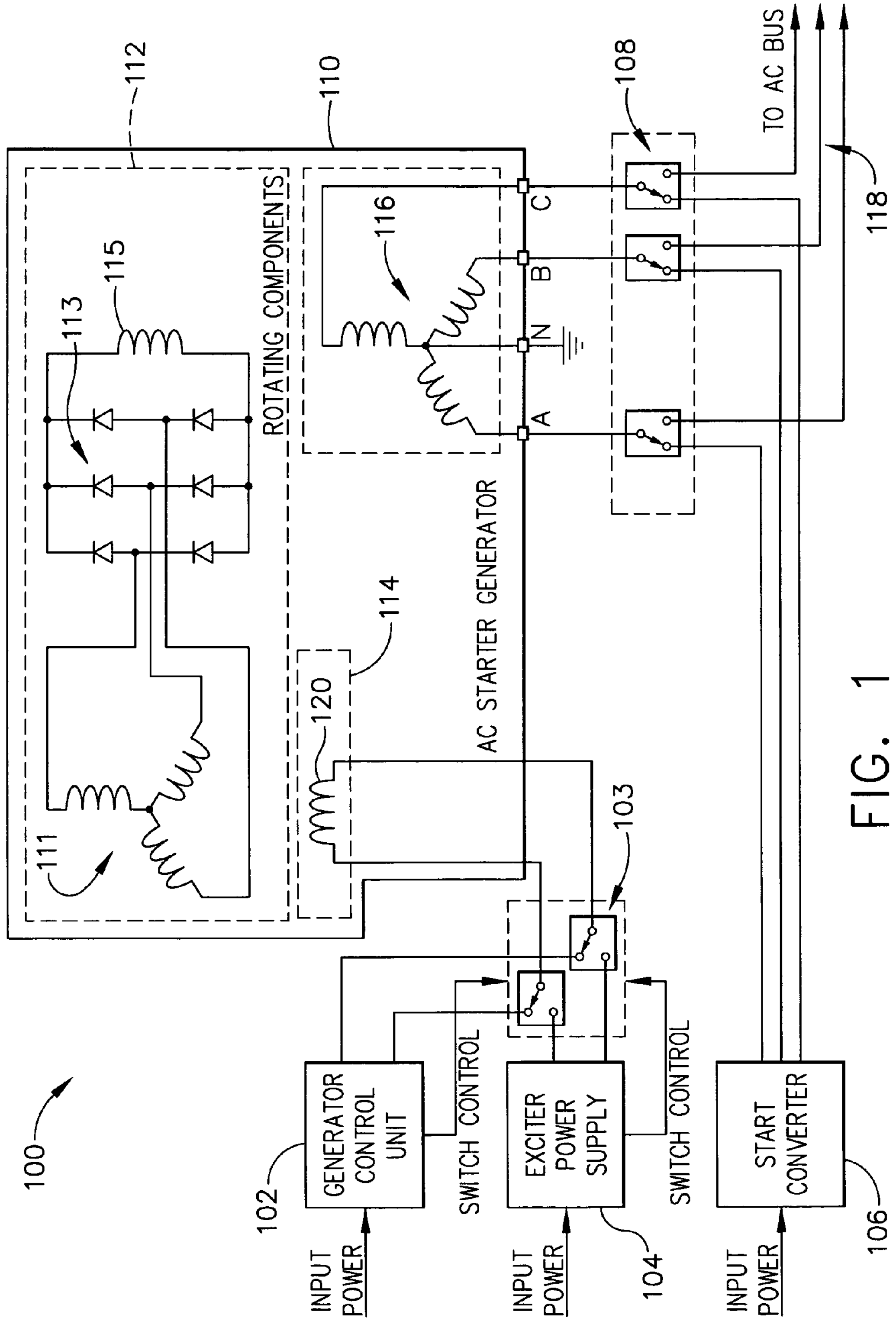
FIG. 1 (PRIOR ART)
FIG. 1 is a block diagram of an exemplary prior art starter/generator system.
Figure 2:
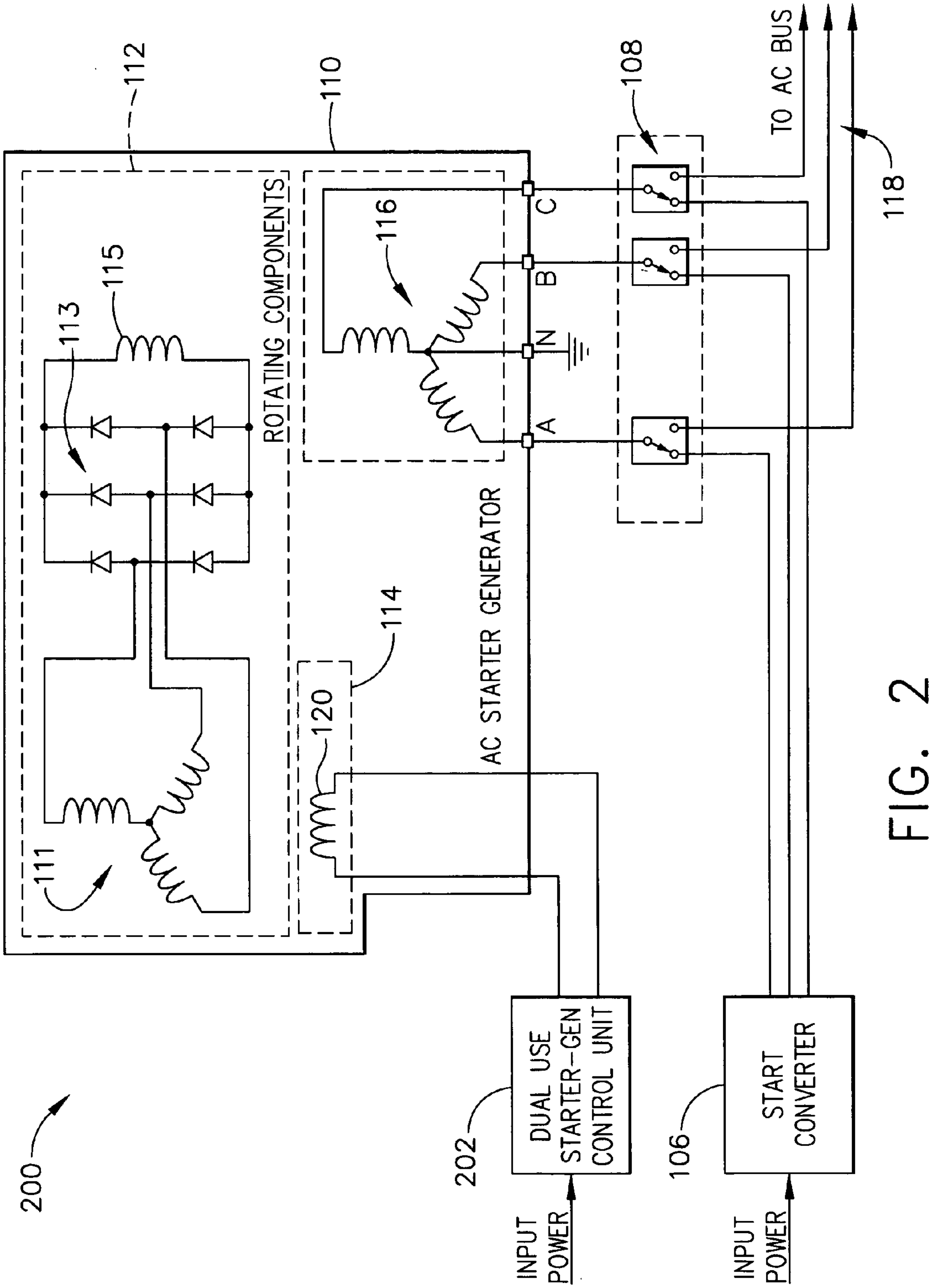
FIG. 2 is a block diagram of an exemplary starter/generator system in accordance with embodiments of the present invention.

FIG. 2 is a block diagram of an exemplary starter/generator system 200 in accordance with embodiments of the present invention. As shown in FIG. 2, generator control unit 102 and exciter power supply 104 of the prior art system 100 (as shown in FIG. 1) have been replaced with a single controller 202 to supply AC and DC power to the exciter stator 114 of the starter/generator 110. Advantageously, remaining elements of prior art system 100 present in system 200 provide a similar function as previously described in accordance with embodiments of the present invention.

Advantageously, during a start mode of operation, system 200 may use the starter/generator 110 as a motor to start an aircraft engine by rotating a generator shaft interconnected to rotor 112 (both shaft and engine not shown). During start mode, controller 202 acts as an exciter power supply to deliver AC power of a predetermined magnitude and frequency to exciter stator 114 using DC winding connection 120. In the start mode, exciter stator 114 acts as a rotary transformer using the input AC power to transfer electric power across an air gap from the DC winding 120 to the polyphase (as shown in FIG. 2) or single-phase (not shown) AC exciter armature winding 111 of the rotor 112 using transformer action flux linkage. The AC exciter armature winding 111 provides three-phase (polyphase) voltage that is rectified by rectifier assembly 113 and coupled to the DC main field winding 115. Additionally, during start mode, start converter 106 couples AC input power to the main stator coil 116 using the POR contact switch 108. The field power developed in the field winding 115 from the AC power applied to the exciter stator 114 coacts with the AC power (output from start converter 106) in the main stator coil 116 to provide starting power (motoring action) to start an aircraft engine by rotating a generator shaft interconnected to rotor 112.

Advantageously, controller 202 may switch to a generate mode of operation after a predetermined (rated) sufficient speed is achieved by the aircraft engine during the start mode. During generate mode, controller 202 switches to supplying DC power to exciter stator 114 via DC field winding 120. During this mode after engine start, rotation of the shaft (not shown) of the aircraft engine generates a polyphase voltage in the AC exciter armature winding 111 that is rectified by the rectifier assembly 113 and coupled to the DC main field winding 115. The current in the generator field winding 115 and the rotation of the shaft sets up a rotating magnetic field in the main stator coil 116 to produce a polyphase frequency output power with regulated voltage at POR contact switch 108 (a predetermined point of system 200) for output to AC bus 118 and delivery to an aircraft load (not shown).

Figure 3:
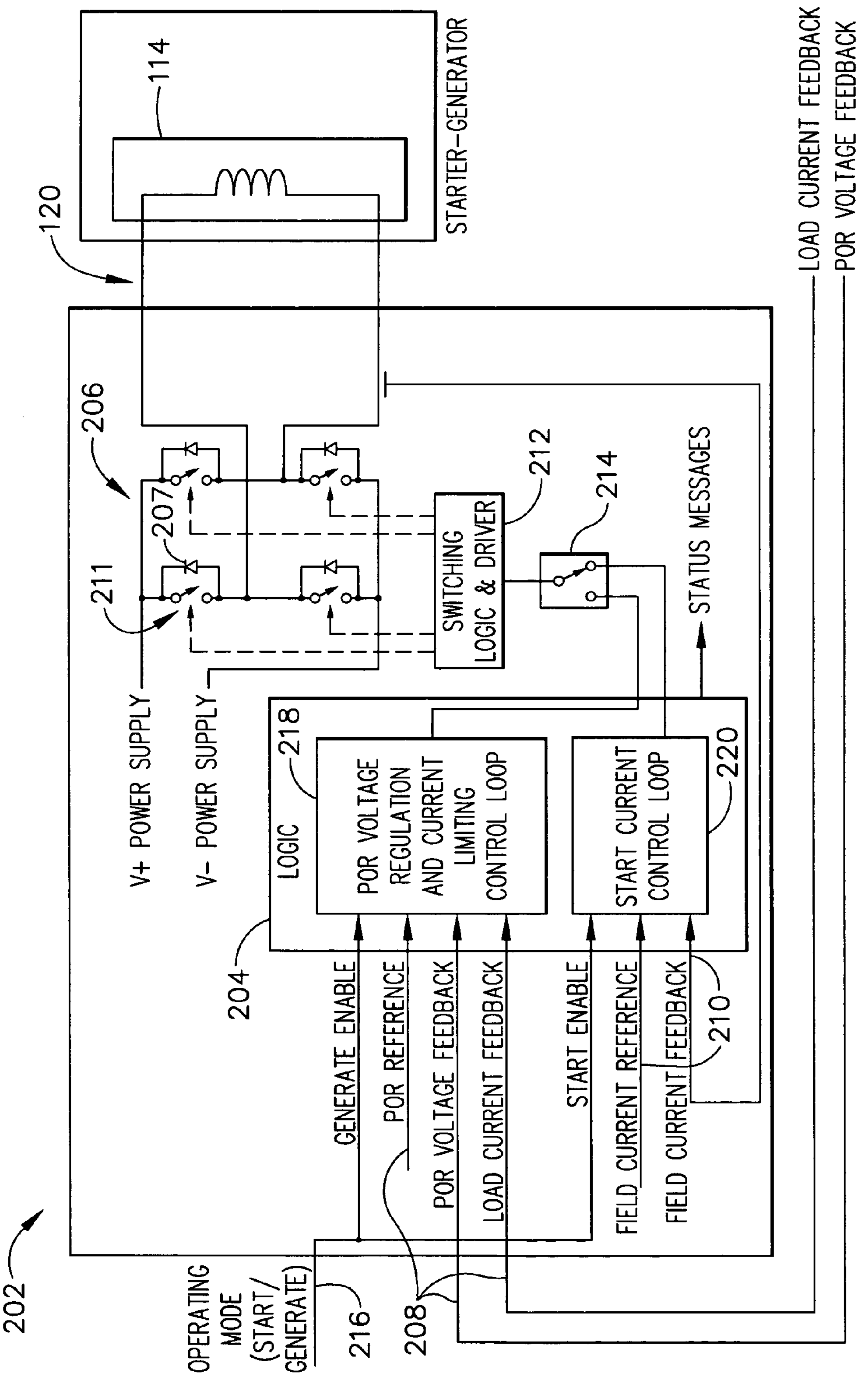
FIG. 3 is a block diagram of an exemplary controller for a starter/generator system in accordance with embodiments of the present invention.

FIG. 3 is a block diagram of an exemplary controller 202 for starter/generator system 200 in accordance with embodiments of the present invention. Advantageously, controller 202 may switch between a start mode to start the aircraft engine and a generate mode to maintain a regulated voltage output from starter/generator 110 at POR 108 after a predetermined (rated) sufficient speed is achieved by the aircraft engine during the start mode.

Controller 202 may include logic units 204, 212, switch 214, and a full bridge (H-bridge) switching unit 206 interconnected to exciter stator 114 of starter/generator 110 via DC field winding 120. Advantageously, full bridge switching unit 206, operation of which is well-known in the field, may supply DC power or AC power (via DC-DC or DC-AC conversion) to exciter stator 114 along DC field winding 120 in response to switching controls, and may include two pairs of reverse diodes 207 with each pair connected in antiparallel with switches 211. The output power supplied by unit 206 may be controlled in magnitude and polarity. Full bridge switching unit 206 may include bipolar transistors, IGBT, MOSFET, and any other type of electronic switch with the required rating to perform DC-DC and DC-AC conversion.

Logic unit 204 may operate as feedback-control unit based on receiving a plurality of inputs 208, 210, 216. It is noted that the number and arrangement of logic units and switches in controller 202 are solely exemplary, and therefore different numbers and arrangement of logic units and switches in controller 202 may be used without departing from the scope of the present invention.

Based on input 216, logic unit 204 switches between either start mode or generate mode by enabling or disabling start logic portion 220 and generate logic portion 218. During start mode, start portion 220 may be enabled by input 216 and send a control signal to switching logic 212, via switch 214, indicating that AC power is to be coupled to exciter stator 114 using full bridge 206 and DC winding 120. In response to the control signal, switching logic 212 directs full bridge 206, coupled to a voltage power supply, to deliver AC power to exciter stator 114 via winding 120 by controlling the full bridge switches 211 allowing AC power to be coupled through the full bridge 206 to winding 120. Advantageously, during start mode, start portion 220 further receives inputs 210 which include a current reference, and a current feedback input taken from winding 120. Based on comparison of the current reference and current feedback inputs 210, start logic portion 220 may adjust the AC excitation of exciter field winding 120 to produce predetermined (desired) flux levels in rotor 112 for reliable engine start.

Alternatively, during generate mode, input 216 may disable start logic portion 220 and enable generate logic portion 218. During generate mode, start portion 220 is enabled by input 216 and sends a control signal to switching logic 212, via switch 214, indicating that DC power is to be coupled to exciter stator 114 using full bridge 206 and DC winding 120. In response to the control signal, switching logic 212 directs full bridge 206, coupled to a voltage power supply, to deliver DC power to exciter stator 114 via winding 120 by controlling the full bridge switches 211 allowing DC power to be coupled through the full bridge 206 to winding 120. Advantageously, during generate mode, generate portion 218 further receives inputs 208 which include a POR voltage reference, and POR voltage feedback and load current feedback inputs taken from POR 108. Based on comparison of the POR reference and voltage and current feedback inputs 208, generate logic portion 218 may adjust the DC excitation of exciter field winding 120 to maintain a regulated voltage or current (during a generator bus short-circuit) level at POR 108 of system 200. Logic unit 204 may further include a status message output to provide an indication as to how the system 200 is operating.

Advantageously, logic unit 204 may operate in either a voltage regulation or current limitation mode during generation. Primarily, logic unit 204 may operate in the voltage regulation mode where the POR voltage reference and voltage feedback inputs 208 are used to provide a regulated voltage output from starter/generator 110 to POR 108. When a fault occurs at the terminals of generator 110, logic unit 204 may operate in a current limitation mode and compare load current feedback input 208 with a preset current reference to limit the current being delivered by starter/generator 110 to POR 108.

A plurality of advantages may be provided in accordance with embodiments of the present invention including a lower cost and weight starter/generator system that provides AC and DC power to a starter/generator using a single controller unit. Additionally, the control apparatus may include multiple, parallel winding connections to the exciter stator (e.g., 2 two-wire connections in parallel between full-bridge and exciter stator) to provide AC and DC excitation to starter/generator.

What is claimed is:

1. A starter/generator system for an engine, comprising:

a starter/generator including an exciter stator with a DC winding; and a multi-use controller, for providing AC power to said exciter stator during a start mode of operation and DC power to said exciter stator during a generate mode of operation, such that said multi-use controller is configured to operate as an exciter power supply during said start mode and as a generator control unit during said generate mode, said multi-use controller comprising:

a power conversion unit for converting input DC power to said AC power provided to said exciter stator during said start mode of operation and converting input DC power to said DC power provided to said exciter stator during said generate mode; and a switching driver configured to drive switching elements of said power conversion unit based on start control signals received during said start mode and based on generate control signals received during said generate mode, such that said switching driver is configured to output first switch driving signals for causing said power conversion unit to perform DC-AC conversion upon receiving start control signals and to output second switch driving signals for causing said power conversion unit to perform DC-DC conversion upon receiving generate control signals.

2. The system of claim 1, wherein said multi-use controller provides the AC power during said start mode with a predetermined magnitude and frequency to energize said exciter stator in said starter/generator, and provides the DC power during said generate mode with a predetermined voltage level to produce a regulated voltage level output from said starter/generator.

3. The system of claim 2, wherein said regulated output voltage is applied at a predetermined portion of an AC bus.

4. The system of claim 1, wherein said starter/generator starts and maintains operation of an aircraft engine.

5. The system of claim 1, wherein said starter/generator is synchronous and brushless.

6. The system of claim 1, further comprising a start converter for starting an engine in combination with said exciter stator.

7. A multi-use controller for a starter/generator system, comprising:

a logic circuit for receiving input signals and generating start control and generator control signals based on said input signals;

a power conversion unit for converting input DC power to said AC power provided to said exciter stator during said start mode of operation and converting input DC power to said DC power provided to said exciter stator during said generate mode; and a switching driver configured to drive switching elements of said power conversion unit based on start control signals received during said start mode and based on generate control signals received during said generate mode, such that said switching driver is configured to output first switch driving signals for causing said power conversion unit to perform DC-AC conversion upon receiving start control signals from said logic unit and to output second switch driving signals for causing said power conversion unit to perform DC-DC conversion upon receiving generate control signals from said logic circuit.

8. The multi-use controller of claim 7, wherein said input signals include signals relating to a regulated voltage level being applied to a particular line portion of said starter/generator system.

9. The multi-use controller of claim 7, wherein said input signals include signals relating to the current level being applied to a predetermined portion of an AC bus.

10. The multi-use controller of claim 7, wherein said input signals include signals selectively enabling the start mode or generate mode of operation, and said controller further comprises a switch for selectively providing said start control signals to said switching driver during said start mode and said generate control signals to said switching driver during said generate mode.

11. The multi-use controller of claim 7, wherein said power conversion unit includes a full bridge arrangement of electronic switches for providing said AC and DC power to said exciter stator.

12. The multi-use controller of claim 11, wherein said full bridge arrangement includes at least four switches.

13. The starter/generator system of claim 1, wherein said controller includes:

a logic unit for generating an operation mode setting signal; and a switch for selectively providing said start control signals to said switching driver during said start mode of operation and said generate control signals to said switching driver during said generate mode of operation.

14. The multi-use controller of claim 1, wherein said power conversion unit includes a full bridge arrangement of electronic switches for providing said AC and DC power to said exciter stator.

15. The multi-use controller of claim 14, wherein said full bridge arrangement includes at least four switches.

16. The starter/generator system of claim 13, wherein said logic unit receives input signals relating to a regulated voltage level being applied to a particular line portion of said starter/generator system.

17. The starter/generator system of claim 13, wherein said logic unit receives input signals selectively enabling the start mode or generate mode of operation.

18. The multi-use controller according to claim 7, wherein said starter/generator system is an aircraft starter/generator system.

19. The multi-use controller according to claim 7, wherein said starter/generator is synchronous and brushless.

* * * * *